(12) United States Patent
Dellacona

(10) Patent No.: US 7,847,664 B2
(45) Date of Patent: Dec. 7, 2010

(54) ELECTROMAGNETIC APPARATUS USING SHARED FLUX IN A MULTI-LOAD PARALLEL MAGNETIC CIRCUIT AND METHOD OF OPERATION

(75) Inventor: Richard Dellacona, Corona Del Mar, CA (US)

(73) Assignee: Verde Power Supply, Inc., Newport Beach, CA (US)

( * ) Notice: Subject to any disclaimer, the term of this patent is extended or adjusted under 35 U.S.C. 154(b) by 31 days.

(21) Appl. No.: 12/387,755

(22) Filed: May 6, 2009

(65) Prior Publication Data

US 2010/0283571 A1 Nov. 11, 2010

(51) Int. Cl.
*H01F 27/28* (2006.01)
*H01F 21/02* (2006.01)

(52) U.S. Cl. .................. 336/180; 336/145; 336/147; 336/184

(58) Field of Classification Search ............. 336/145, 336/147, 180, 184
See application file for complete search history.

(56) References Cited

U.S. PATENT DOCUMENTS

| | | | |
|---|---|---|---|
| 2,399,185 A | 4/1946 | Hedding | |
| 3,086,159 A | 4/1963 | Daly | |
| 3,418,563 A * | 12/1968 | Grosu | 323/340 |
| 3,457,492 A * | 7/1969 | Rabanit | 322/96 |
| 3,772,565 A * | 11/1973 | Lenz et al. | 315/276 |
| 4,488,136 A | 12/1984 | Hansen et al. | |
| 4,574,222 A | 3/1986 | Anderson | |
| 4,687,947 A | 8/1987 | Cobb | |
| 4,766,365 A * | 8/1988 | Bolduc et al. | 323/308 |
| 5,349,173 A | 9/1994 | Scheckel et al. | |
| 6,297,616 B1 * | 10/2001 | Kubo et al. | 320/116 |
| 6,822,546 B1 * | 11/2004 | Jakab et al. | 336/178 |
| 7,042,323 B2 * | 5/2006 | Joerg et al. | 336/184 |
| 2002/0117896 A1 | 8/2002 | Gohara | |
| 2008/0157603 A1 | 7/2008 | Baarman et al. | |
| 2008/0191638 A1 | 8/2008 | Kuennen et al. | |
| 2008/0231120 A1 | 9/2008 | Jin | |
| 2009/0021219 A1 | 1/2009 | Yoda et al. | |
| 2009/0051224 A1 | 2/2009 | Cook et al. | |
| 2009/0058189 A1 | 3/2009 | Cook et al. | |
| 2009/0058190 A1 | 3/2009 | Tanaka | |
| 2009/0085408 A1 | 4/2009 | Bruhn | |

FOREIGN PATENT DOCUMENTS

WO    WO2009/027674    3/2009

OTHER PUBLICATIONS

International Search Report and Written Opinion, International Application No. PCT/US2010/033606, Mailed Jun. 16, 2010, 7 pages.

* cited by examiner

*Primary Examiner*—Elvin G Enad
*Assistant Examiner*—Ronald W Hinson
(74) *Attorney, Agent, or Firm*—Knobbe, Martens, Olson & Bear LLP

(57) ABSTRACT

A flux sharing magnetic circuit has a parallel arrangement of secondary electromagnetic circuits with independent loads. An AC driven primary delivers current to the secondary circuits to maintain charge in their batteries. The batteries deliver DC current to the loads while secondary coils provide battery charging currents to maintain charge in the batteries. When current is not drawn by the battery or the load, flux is delivered to a flux pool in the magnetic circuit so that input AC power drain is reduced.

2 Claims, 1 Drawing Sheet

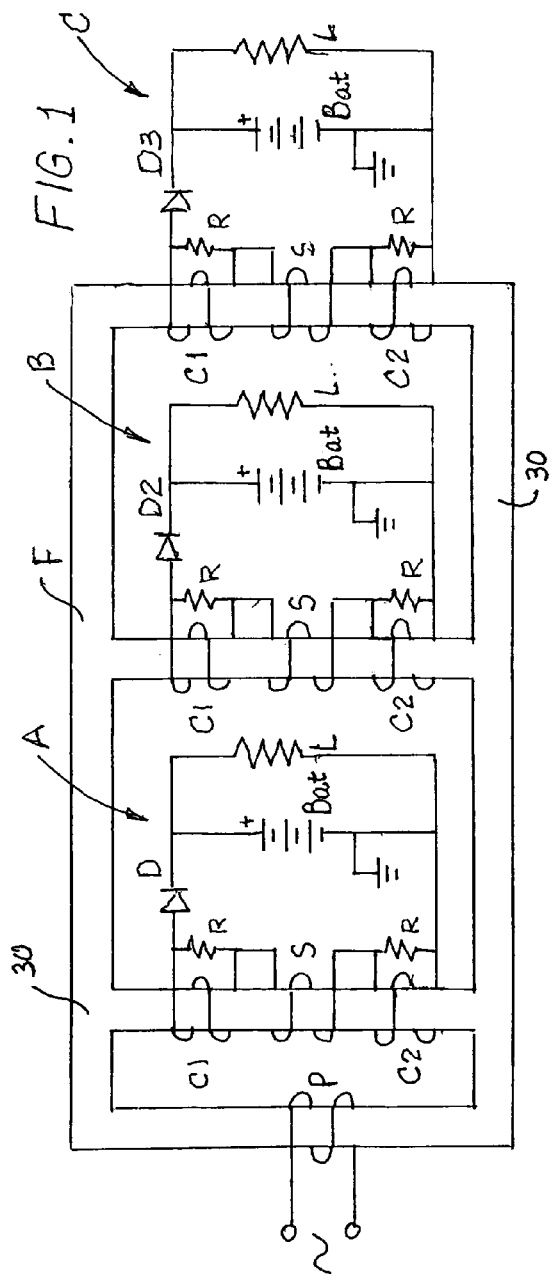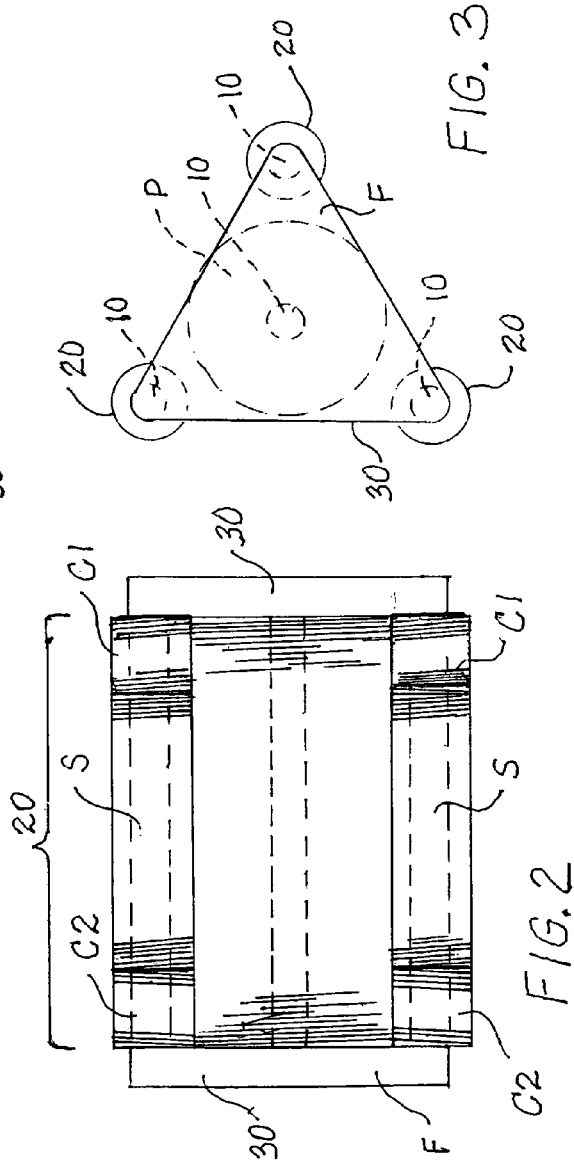

ELECTROMAGNETIC APPARATUS USING SHARED FLUX IN A MULTI-LOAD PARALLEL MAGNETIC CIRCUIT AND METHOD OF OPERATION

BACKGROUND OF THE INVENTION

1. Field of the Present Disclosure

This disclosure relates generally to electromagnetic inductive devices as current drivers for DC loads and more particularly to a parallel, multi-load circuit wherein flux is shared as a pool to thereby reduce input AC power.

2. Description of Related Art Including Information Disclosed Under 37 CFR 1.97 and 1.98

Bruhn, US 2009/0085408 discloses an apparatus and a method for wireless energy and/or data transmission between a source device and at least one target device, in which apparatus and method a voltage is induced by at least one primary coil, on the source-device side, of at least one primary circuit in at least one secondary coil, on the target-device side, of at least one secondary circuit and in at least one coil of at least one resonant circuit, the resonant circuit being arranged so as to be electrically isolated from the primary circuit and from the secondary circuit.

Tanaka, US 2009/0058190 discloses a power receiving device capable of receiving a carrier wave transmitted from a power transmitting device without contact and obtaining electric power from the received carrier wave, which includes a carrier receiving section at least including a communication antenna having predetermined inductance and not equipped with an intermediate tap, to receive the carrier wave and generate an induced voltage corresponding to the carrier wave, a processing section to generate a drive voltage based on the induced voltage and perform data processing using the generated drive voltage, and an impedance converting section to convert impedance between the carrier receiving section and the processing section.

Cook et al., US 2009/0058189 discloses a transmission of power at low frequencies, e.g. less than 1 MHz. The power can be transmitted in various ways, using different structures included stranded wire such as Litz wire. The inductor can also use cores of ferrites for example. Passive repeaters can also be used.

Cook et al., US 2009/0051224 discloses a wireless powering and charging antenna systems. The antennas can be high q loop antennas. The antennas can use coupling between a first part and a second part.

Yoda et al., US 2009/0021219 discloses that a power reception control device provided in a power reception device of a non-contact power transmission system includes a power-reception-side control circuit that controls an operation of the power reception device, and a power supply control signal output terminal that supplies a power supply control signal to a charge control device, the power supply control signal controlling power supply to a battery. The power-reception-side control circuit controls a timing at which the power supply control signal (ICUTX) is output from the power supply control signal output terminal. The operation of the charge control device is compulsorily controlled using the power supply control signal (ICUTX).

Jin, US 2008/0231120 discloses a noncontact power transmission system having a power transmitting device including a primary coil and a power receiving device including a secondary coil, the primary coil and the secondary coil being electromagnetically coupled to each other and the power transmitting device configured to transmit electric power to the power receiving device, wherein the secondary coil contains a magnetic substance, the power transmitting device has a feeding section for feeding power to the primary coil and a self inductance detection section for detecting a change in the self inductance of the primary coil immediately after starting the feeding to the primary coil, wherein a feeding operation of the feeding section immediately after starting the feeding is determined based on a detection result of the self inductance detection section.

Kuennen et al., US 2008/0191638 discloses a ballast circuit for inductively providing power to a load. The ballast circuit includes an oscillator, a driver, a switching circuit, a resonant tank circuit and a current sensing circuit. The current sensing circuit provides a current feedback signal to the oscillator that is representative of the current in the resonant tank circuit. The current feedback signal drives the frequency of the ballast circuit causing the ballast circuit to seek resonance. The ballast circuit preferably includes a current limit circuit that is inductively coupled to the resonant tank circuit. The current limit circuit disables the ballast circuit when the current in the ballast circuit exceeds a predetermined threshold or falls outside a predetermined range.

Baarman et al., US 2008/0157603 discloses an inductive power supply system to identify remote devices using unique identification frequencies. The system includes an AIPS and a tank circuit capable of inductively providing power to a remote device at different frequencies, and a sensor for sensing the reflected impedance of the remote device at tank circuit. The system further includes a plurality of different remote devices, each having a unique resonance frequency. In operation, the AIPS is capable of identifying the type of remote device present in the inductive field by applying power to a remote device at a plurality of unique identification frequencies until the remote device establishes resonance in response to one of the identification frequencies. The AIPS includes a controller that recognizes when resonance has been established by evaluating sensor data, which is representative of the reflected impedance of the remote device. Once the identity of a remote device is determined, the AIPS may pull operating parameters for the remove device from memory to ensure efficient operation and to assist in recognizing fault conditions.

Gohara, US 2002/0117896 discloses an arrangement such that electric power is supplied through the action of mutual induction between two members on a vehicle body side a sliding door side. In addition, an arrangement is provided such that respectively different induced electromotive forces are caused to occur in secondary-side feeding coils and, and the supply of electric power is effected for each of the secondary-side feeding coils. An arrangement is provided such that a first storage member and a second storage member are respectively connected to the secondary-side feeding coils with a rectifier circuit interposed therebetween, so as to supply electric power corresponding to characteristic requirements of corresponding loads.

Scheckel et al., U.S. Pat. No. 5,349,173 discloses an apparatus for contactless data and energy transmission which includes a stationary part having at least one coil for data and energy transmission, and an oscillator connected to the at least one coil for energy transmission. A movable part has at least one coil for data and energy transmission, at least one rectifier device connected downstream of the at least one coil, and at least one charge capacitor connected to the at least one rectifier device for carrying a pulsating operating voltage. One pair of the coils is used for energy transmission and one pair of the coils is used for data transmission. The coils of the movable part are arbitrarily associated with the coils of the stationary part. A device is disposed in the movable part for transmitting data from the movable part to the stationary part, by returning a portion of energy received through an applicable one of the coils of the movable part, modulated in accordance with a data signal, through another of the coils of the movable part.

Fells et al., WO 2009/027674 discloses that there is an inductive power transfer system comprising a primary unit and a secondary device separable from the primary unit, the primary unit comprising a power transfer surface and more than two field generators each operable to generate an electromagnetic field, the field generators being located at different positions relative to the power transfer surface, the secondary device comprising a power receiver having a secondary coil, the system further comprising: determining means for determining at least one of the position and the orientation of the power receiver relative to the power transfer surface; and controlling means for controlling the field generators such that at least one first field generator and at least one second field generator, selected in dependence upon such determination, are active in a substantially opposite sense to one another so as to direct magnetic flux through the secondary coil thereby supplying power to the secondary device, and further such that a third one of the field generators is inactive so that fewer than all of the field generators are active simultaneously.

The related art described above discloses a number of inductive circuits including power transfer systems, contactless data and energy transmission and wireless power transmission systems. However, the prior art fails to disclose the concepts inherent in the present circuit which provide a means for flux sharing in a parallel magnetic circuit. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

The presently described device has a primary coil magnetically coupled to a plurality of, and at least two, secondary circuits. Each one of the secondary circuits has a secondary coil, and each secondary coil is coaxially wound, linearly aligned and in an electrical series connection, with two control coils, with the control coils wound in opposite sense to each other. The secondary coils may be wound for different output voltages as required by their respective loads. The series coils, in each of the secondary circuits are arranged in electrical parallel with both a battery and a load. A diode is placed to assure that current flows toward the positive terminal of the battery. The battery may be replaced by a capacitor circuit as an equivalent functional element. The primary coil and the series coils in each of the secondary circuits are physically arranged in parallel positions and therefore are able to share magnetic flux developed across the parallel magnetic circuit arrangement.

A primary objective inherent in the above described apparatus and method of use is to provide advantages not taught by the prior art.

Another objective is to provide a flux sharing inductive circuit capable of meeting the current requirements of plural variable loads while using less input power at its primary.

A further objective is to provide such a flux sharing inductive circuit capable of reducing input power requirements significantly depending on its load configuration.

A still further objective is to provide such a flux sharing inductive circuit with a parallel physical coil mounting.

A still further objective is to provide such a flux sharing inductive circuit wherein secondary coils are controlled by adjacent coaxially wound control coils.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING

Illustrated in the accompanying drawings is at least one of the preferred embodiments of the present invention In such drawings:

FIG. 1 is a schematic diagram of the presently described apparatus; and

FIG. 2 is a side view of coil windings and magnetically permeable core and integral end structure of the apparatus; and FIG. 3 is an end view of the structure shown in FIG. 2.

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

Referring to the electrical schematic diagram of FIG. 1, a primary coil P shares a common ferrite structure (magnetic circuit) F with secondary circuits A, B, and C, which are essentially identical to each other in their structure, although typically not their component values and loads, as will be described. The three secondary circuits A, B, and C, represented in FIG. 1 is only one example of how the present invention may be enabled, and, in fact, there may be only two of the secondary circuits, and there may be more than three, without limit, in alternate embodiments of the present invention.

The primary coil P is energized by a source of alternating current as shown in the diagram. Ferrite structure F provides cores 10 upon which the primary coil P and the three separate secondary coil assemblies 20 (FIG. 3) are separately wound, the secondary coil assemblies 20 providing induced currents in their respective secondary circuits A, B, and C. Primary coil P operates as an electromagnet which has, at any instant, opposing north and south poles. These poles appear across the cores of the secondary coil assemblies 20 as well since they are in parallel with the core of primary coil P through ferrite end structures 30 as shown in FIG. 2, and which are integral with the cores 10.

Each secondary coil assembly 20 comprises a secondary coil S, and two control coils C1 and C2, the control coils C1 and C2 are wound with identical forms, turns, etc., but in reverse winding sense, that is, in opposition to each other. All three coils are wound on a common core 10 so that they share the same magnetic flux and are wired in electrical series connection and in a linear sequence. Additionally, as shown, each of the control coils is shunted by a resistor R.

Referring now to secondary circuit A as an example of all three of the secondary circuits, the three coils of coil assembly 20, i.e., C1, S and C2, are placed in parallel with both battery Bat and load L. Diode D joins coil assembly 20 with the battery Bat and load L. As stated previously, circuits B and C are each similarly arranged. During one half of the AC cycle the positive terminal of the battery Bat and also the loads L receive current flows from the series connection of the shunt resistor R across control coil C1 and diode D. During the alternate one half cycle there is no current flow due to diode D.

Battery Bat, provides a constant DC voltage across its load L. Current drain from battery Bat depends on changes in the impedance of load L. The coil assembly C1, S, C2 instantaneously makes up for battery drain during the conducting half of the AC cycle.

When battery Bat is fully charged, the current across the shunt R increases thereby increasing the flux in its control coil C1 which opposes the flux from the common flux pool from flowing through the secondary coil S thereby cutting off current flow to the battery Bat. When this happens, the magnetic field at secondary coil S collapses, or at least partially collapses, producing a reverse current which generates a flux which is additive to the flux in the core 10 of primary coil P. This limits current flow in the primary coil P so that the entire system comprising primary coil P and secondary circuits A, B and C requires less AC power overall than the total power that would be required of the three secondary circuits if driven separately.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. An electromagnetic circuit comprising:
   a primary coil wound on a primary core of magnetically permeable material, the primary core energized by an AC voltage;
   at least two secondary circuits, each having a secondary coil assembly wound on a secondary core of magnetically permeable material, the primary and secondary cores arranged as a parallel magnetic circuit;
   each of the coil assemblies comprising a secondary coil wound in series, on a common said secondary core with a pair of control coils, the control coils positioned on opposing sides of the secondary coil, wherein the control coils are wound in a reverse sense with respect to each other, and each of the control coils shunted by a resistor;
   the secondary circuits each further providing a diode positioned between the coil assembly and an electrically parallel arrangement of a battery and a load.

2. A method of conserving energy to a circuit having parallel loads, the method comprising the steps of:
   a) energizing a primary coil wound on a primary core of magnetically permeable material with an AC voltage;
   b) inducing voltages in at least two secondary circuits, each one of the secondary circuits providing a coil assembly comprising a secondary coil wound in series on a common secondary core of magnetically permeable material with a pair of control coils, the control coils positioned on opposing sides of the secondary coil, wherein the control coils are wound in opposing senses with respect to each other, and the control coils each shunted by a resistor;
   c) arranging the primary core and the secondary cores as a parallel magnetic circuit; and
   d) conducting current from each coil assembly to the battery and load through a diode.

* * * * *